United States Patent
Blankenship et al.

(10) Patent No.: US 9,450,735 B2
(45) Date of Patent: Sep. 20, 2016

(54) SYSTEM AND METHOD FOR COMMUNICATING OVER MULTIPLE COMMUNICATIONS LINKS

(75) Inventors: Yufei Blankenship, Kildeer, IL (US); Weimin Xiao, Hoffman Estates, IL (US); Brian Classon, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 850 days.

(21) Appl. No.: 13/297,740

(22) Filed: Nov. 16, 2011

(65) Prior Publication Data

US 2012/0120829 A1 May 17, 2012

Related U.S. Application Data

(60) Provisional application No. 61/414,317, filed on Nov. 16, 2010.

(51) Int. Cl.
*H04L 5/00* (2006.01)

(52) U.S. Cl.
CPC .............. *H04L 5/006* (2013.01); *H04L 5/001* (2013.01); *H04L 5/0023* (2013.01); *H04L 5/0092* (2013.01)

(58) Field of Classification Search
None
See application file for complete search history.

(56) References Cited

U.S. PATENT DOCUMENTS

| | | | |
|---|---|---|---|
| 2009/0042580 A1* | 2/2009 | Chiricescu et al. | 455/450 |
| 2009/0161783 A1* | 6/2009 | Ozluturk | 375/260 |
| 2010/0303016 A1 | 12/2010 | Jin et al. | |
| 2010/0322171 A1* | 12/2010 | Dekorsy | H04B 7/0621 370/329 |
| 2011/0032839 A1* | 2/2011 | Chen | H04B 7/024 370/25 |
| 2012/0014257 A1* | 1/2012 | Ahluwalia et al. | 370/241 |
| 2013/0176959 A1* | 7/2013 | Parkvall | H04L 5/0094 370/329 |
| 2014/0073325 A1* | 3/2014 | Karaoguz | H04W 36/0066 455/436 |

OTHER PUBLICATIONS

3rd Generation Partnership Project; Technical Specification Group Radio Access Network; Evolved Universal Terrestrial Radio Access (E-UTRA); Multiplexing and channel coding (Release 9), 3GPP TS 36.212, V9.3.0, Sep. 2010, 61 pages.
"Introduction of Rel-10 LTE-Advanced features in 36.212," 3GPP TSG-RAN Meeting #62, R1-105097, Aug. 23-27, 2010, 94 pages, Madrid Spain.
"LS on Rel-10 UE category," 3GPP TSG RAN WG1 Meeting #62, R1-105095, Aug. 23-27, 2010, 4 pages, Madrid, Spain.
"WF on UE Category for Rel. 10," 3GPP TSG RAN WG1 Meeting #62, R1-105036, Aug. 23-27, 2010, 4 pages, Madrid, Spain.
"Soft buffer size allocation for Rel-10 UE," 3GPP TSG RAN WG1 Meeting #63, R1-105937, Nov. 15-19, 2010, 3 pages, Jacksonville, USA.

\* cited by examiner

*Primary Examiner* — Chirag Shah
*Assistant Examiner* — Srinivasa Reddivalam
(74) *Attorney, Agent, or Firm* — Slater Matsil, LLP (57) ABSTRACT

An embodiment method for operating a device in receiving a transmission over a plurality of communications links includes assigning an allocatable receiver resource to each communications link in the plurality of communications links according to a measure derived from communications link characteristics of each respective communications link and combined communications link characteristics of the plurality of communications links, and receiving the transmission over the plurality of communications links with the assigned allocatable receiver resource.

30 Claims, 7 Drawing Sheets

SYSTEM AND METHOD FOR COMMUNICATING OVER MULTIPLE COMMUNICATIONS LINKS

This application claims the benefit of U.S. Provisional Application No. 61/414,317, filed on Nov. 16, 2010, entitled "System and Method for Downlink MIMO," which application is hereby incorporated herein by reference.

TECHNICAL FIELD

The present invention relates generally to digital communications, and more particularly to a system and method for communicating over multiple communications links.

BACKGROUND

Generally, a communications link is be considered to be a communications channel between two or more communicating devices. The communications link utilizes a single carrier frequency or multiple carrier frequencies. Furthermore, a single communications device receives a transmission or multiple transmissions over multiple communications links. The transmission or the multiple transmissions over the multiple communications link can be from a single communications device or from multiple communications devices.

As an example, in a Third Generation Partnership Project (3GPP) Long Term Evolution (LTE) compliant communications system, multiple communications links (commonly referred to as component carriers) can be aggregated to facilitate high bandwidth transmissions between two communications devices.

As an additional example, Multiple Input and Multiple Output (MIMO) technology uses multiple antennas at both communications devices to improve communications performance. MIMO offers increased data throughput and range, often without additional bandwidth or transmit power. MIMO achieves improved performance through higher spectral efficiency (more bits per second per hertz of bandwidth) and link reliability or diversity. Transmissions between the transmit antennas of a transmitting communications device and the receive antennas of a receiving communications device may comprises multiple transmission layers. Each transmission layer is associated with a set of precoding weights, which is applied to one of the transmit antenna ports.

A precoder is considered to then be a set of precoding weights, with one precoding weight for each transmission antenna and each transmission layer. A MIMO transmission layer is also commonly known as a MIMO stream. The multiple layers of MIMO transmission may be divided into one or more codewords where each codeword may be mapped to one or more transmission layers. Each codeword comprises one or more data code blocks (CB) which are collectively referred to as a transport block (TB). All the transmission layers associated with a codeword are of the same modulation and coding scheme (MCS) while transmission layers associated with different codewords may have different MCS levels. The MCS levels of the codewords may be independently determined at the eNB and signaled to the UE. Each of the MIMO transmission layers or codewords may be considered as a communication link between the two communication devices.

As another example, in Multiple Point transmission, a communications device may receive transmissions from two or more transmission points with each transmission occurring over one or more communications links. As yet another example, in Coordinated Multiple Point transmission, a communications device may simultaneously receive transmissions from two or more transmission points with each transmission occurring over one or more communications links. As a further example, in a heterogeneous communications system, a communications device may receive transmissions from two or more transmission points with the transmission points accessing the heterogeneous communications system using different radio access technologies, potentially different from a radio access technology used by the communications device.

SUMMARY OF THE INVENTION

Example embodiments of the present invention which provide a system and method for communicating over multiple communications links.

In accordance with an example embodiment of the present invention, a method for operating a device in receiving a transmission over a plurality of communications links is provided. The method includes assigning an allocatable receiver resource to each communications link in the plurality of communications links according to a measure derived from communications link characteristics of each respective communications link and combined communications link characteristics of the plurality of communications links, and receiving the transmission over the plurality of communications links with the assigned allocatable receiver resource.

In accordance with another example embodiment of the present invention, a method for operating a device in transmitting a transmission over a plurality of communications links is provided. The method includes assigning an allocatable transmitter resource to each communications link in the plurality of communications links according to a measure derived from communications link characteristics of each respective communications link and combined communications link characteristics of the plurality of communications links, and transmitting a transmission over the plurality of communications links to an intended recipient with the assigned allocatable transmitter resource.

In accordance with another example embodiment of the present invention, a device is provided. The device includes a processor, and a receiver coupled to the processor. The processor assigns an allocatable receiver resource to each communications link in a plurality of communications links according to a measure derived from communications link characteristics of each respective communications link and combined communications link characteristics of the plurality of communications links. The receiver receives a transmission over the plurality of communications links with the assigned allocatable receiver resource.

In accordance with another example embodiment of the present invention, a device is provided. The device includes a processor, and a transmitter coupled to the processor. The processor assigns an allocatable transmitter resource to each communications link in a plurality of communications links according to a measure derived from communications link characteristics of each respective communications link and combined communications link characteristics of the plurality of communications links. The transmitter transmits a transmission over a plurality of communications links to an intended recipient with the assigned allocatable transmitter resource.

One advantage of an embodiment is that allocatable resources of a communications device may be assigned based on the communications link characteristics of a communications link. Therefore, situations wherein assigned resources that are inadequate meet the demands of the communications are largely avoided. Furthermore, situations wherein too many allocatable resources are assigned to a communications link are also largely avoided.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present invention provides many applicable inventive concepts that can be embodied in a wide variety of specific contexts. The specific embodiments discussed are merely illustrative of specific structures of the invention and ways to operate the invention, and do not limit the scope of the invention.

One embodiment of the invention relates to assigning allocatable resources for receiving a transmission or transmissions over multiple communications links based on a measure derived from the characteristics of the communications links. For example, at a user equipment, a first communications link that has greater characteristics than a second communications link will be assigned allocatable resources in greater quantity than the second communications link.

The present invention will be described with respect to example embodiments in a specific context, namely a standards compliant communications system, such as Third Generation Partnership (3GPP) Long Term Evolution (LTE), 3GPP LTE-Advanced, IEEE 802.11x, IEEE 802.16m, WiMAX, and the like, technical standards compliant communications systems. Embodiments may be applied to non-standards compliant communications systems that support a communications device receiving transmissions over multiple communications links or transmitting transmissions over multiple communications links.

Figure 1:
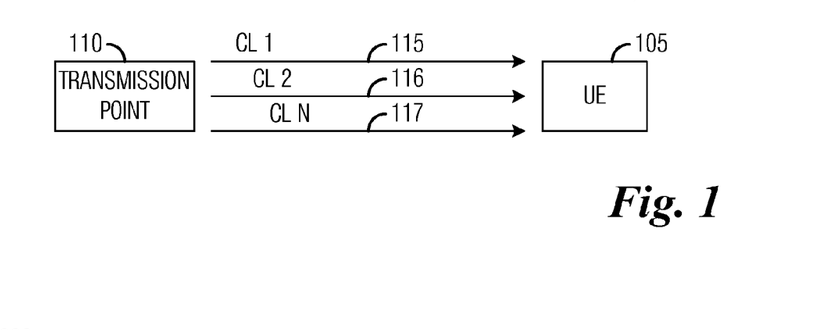
FIG. 1 illustrates a portion of an example first communications system according to example embodiments described herein.

FIG. 1 illustrates a portion of a first communications system 100. As shown in FIG. 1, first communications system 100 includes a User Equipment (UE) 105 receiving a transmission or transmissions from a transmission point 110, such as an evolved Node B (eNB). A UE may also be commonly referred to as a mobile station (MS), a user, a terminal, a subscriber, and the like. The transmission point may be an eNB, a relay node, another UE, an information source, or the like. An eNB may also be commonly referred to as a controller, a communications controller, a base station (BS), a NodeB, and the like. While it is understood that communications systems may employ multiple transmission points capable of communicating with a number of UEs, only one transmission point and one UE are illustrated for simplicity.

UE 105 is receiving a transmission or transmissions from transmission point 110 over a plurality of communications links (CL), such as CL 1 115, CL 2 116, and CL N 117. As an example, if first communications system 100 was a 3GPP LTE compliant communications system, each of the communications links is referred to as a component carrier, and the plurality of communications links (component carriers) may be aggregated together.

Figure 2:
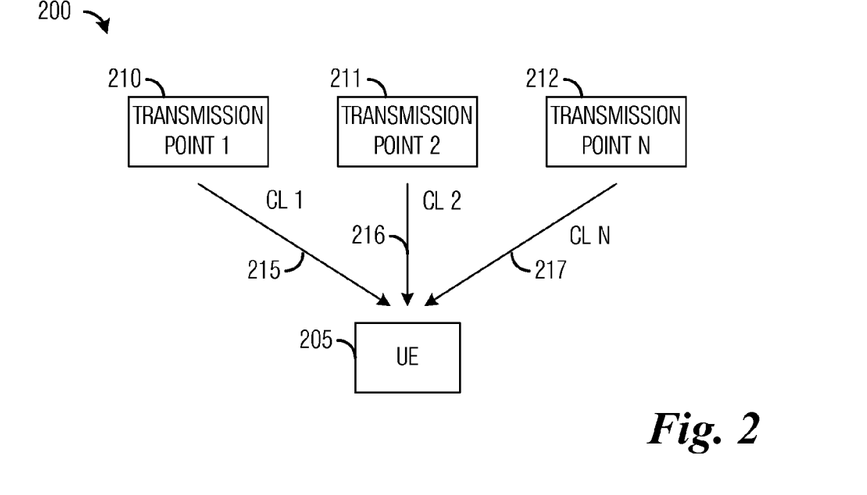
FIG. 2 illustrates a portion of an example second communications system according to example embodiments described herein.

FIG. 2 illustrates a portion of a second communications system 200. As shown in FIG. 2, a UE 205 is receiving a transmission or transmissions from a plurality of transmission points, such as transmission point 1 210, transmission point 2 211, and transmission point N 212. A transmission or transmissions between UE 205 and each transmission point in the plurality of transmission points may occur over a different communications link. As an example, a CL 1 215 is used to carry a transmission between transmission point 1 210 and UE 205. Similarly, CL 2 216 and CL N 217, respectively, are used to carry transmissions between transmission point 2 211 and transmission point N 212 to UE 205.

Although shown as a single communications link, the communications link between a transmission point and the UE may be an aggregate of a plurality of communications links. Therefore, the illustration and discussion of a single communications link between a transmission point and the UE should not be construed as being limiting to either the scope or the spirit of the example embodiments.

Figure 3:
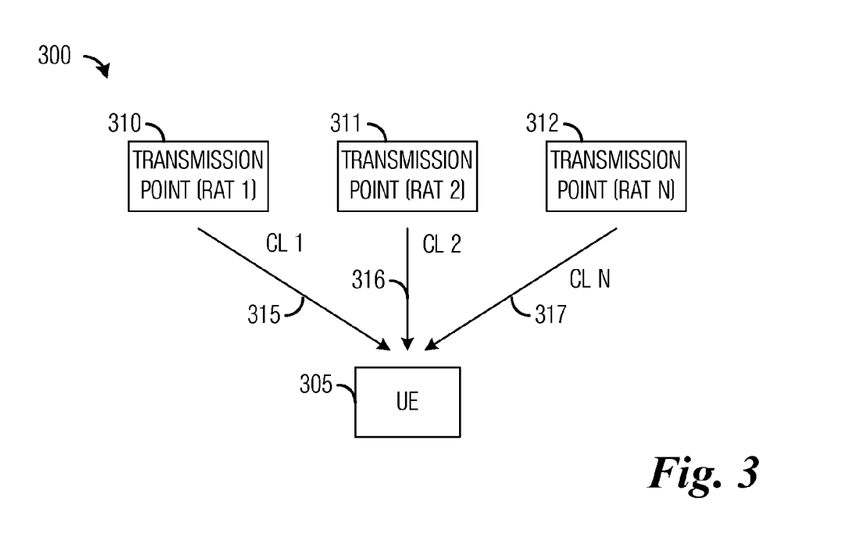
FIG. 3 illustrates a portion of an example third communications system according to example embodiments described herein.

FIG. 3 illustrates a portion of a third communications system 300. As shown in FIG. 3, a UE 205 is receiving a transmission or transmissions from a plurality of transmission points accessing through different radio access technologies (RAT), such as transmission point 1 310 accessing through RAT 1, transmission point 2 311 accessing through RAT 2, and transmission point N 312 accessing through RAT N. Examples of different RATs include 3GPP LTE, IEEE 802.11x, IEEE 802.16m, WiMAX, Bluetooth, GSM, CDMA, and the like.

A transmission between UE 305 and each respective transmission point in the plurality of transmission points may occur over a different communications link. As an example, a CL 1 315 is used to carry a transmission between transmission point 1 310 and UE 305. Similarly, CL 2 316 and CL N 317, respectively, are used to carry transmissions between transmission point 2 311 and transmission point N 312 to UE 305. Since the transmission points in the plurality of transmission points are accessing UE 305 through different RATs, the respective communications links are different access technology communications links.

Although shown as a single communications link, the communications link between a transmission point and the UE may be an aggregate of a plurality of communications links. Therefore, the illustration and discussion of a single communications link between a transmission point and the UE should not be construed as being limiting to either the scope or the spirit of the example embodiments.

Figure 4:
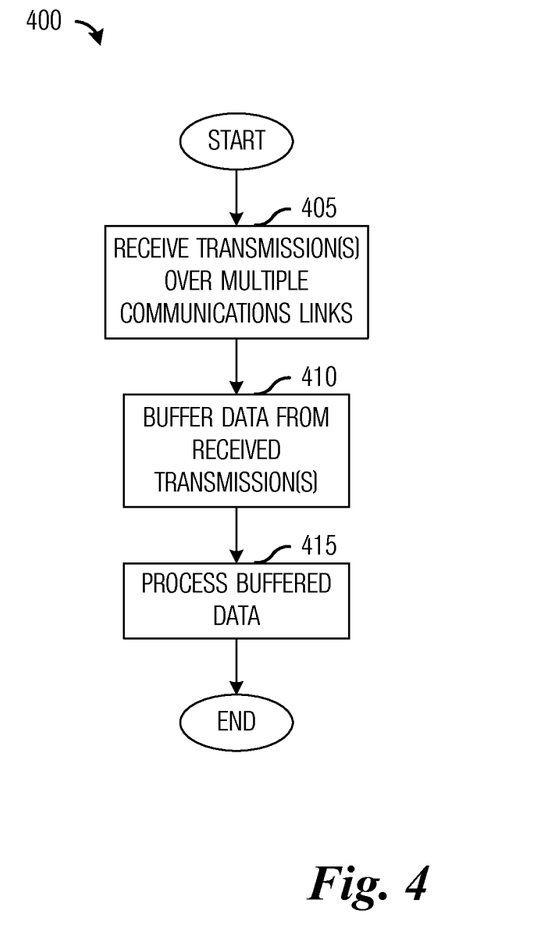
FIG. 4 illustrates an example flow diagram of operations in processing a transmission or transmissions received over multiple communications links according to example embodiments described herein.

FIG. 4 illustrates a flow diagram of operations 400 in processing a transmission or transmissions received over multiple communications links. Operations 400 may be indicative of operations occurring in a UE, such as UE 105, UE 205, or UE 305, as the UE receives a transmission or transmissions over multiple communications links from one or more transmission points, such as eNBs, relay nodes, other UEs, information sources, and the like. The transmission points may access the UE using a single RAT or multiple RATs.

Operations 400 begin with the UE receiving a transmission or transmissions over multiple communications links (block 405). The UE decodes the transmission or transmissions on a communications link basis and buffers the data from the decoded transmission (block 410). The UE may buffer the data from each communications link in a separate buffer.

As an example, if the UE is receiving a transmission from a transmission point over two communications links that have been aggregated, the UE may buffer first data from a first communications link into a first buffer and second data from a second communications link into a second buffer. As another example, if the UE is receiving transmissions from two transmission points over two communications links, the UE may buffer first data from a first transmission point (over a first communications link) in a first buffer and second data from a second transmission point (over a second communications link) in a second buffer. The UE processes the buffered data (block 415).

As discussed previously, each of the communications link in a plurality of communications links over which a UE receives transmissions may have different capabilities or requirements, which may be referred to as communications link characteristics. As an example, considering a 3GPP LTE Release-10 compliant communications system, communications links (i.e., component carriers) may be either 10 MHz or 20 MHz wide. Additionally, each communications link may have a different number of downlink layers for MIMO operation. Hence, communications link characteristics of a communications link in the 3GPP LTE Release-10 compliant communications system may include: a number of soft channel bits, a number of downlink Hybrid Automatic Repeat Requested (HARQ) processes, a limiting constant, a total number of aggregated communications links, a MIMO mode, a number of downlink layers, a bandwidth of the communications link, a data rate of the communications link, a coding scheme used in the communications link, a quality of service requirement of an application utilizing the communications link, a priority of the device receiving and/or transmitting, a priority of a user of the device, a priority of the application, a power consumption of the device, an interference situation of the device, and the like. These parameters (and potentially others) characterize the capabilities of the communications link and may be used to allocate a buffer for the communications link.

Figure 5:
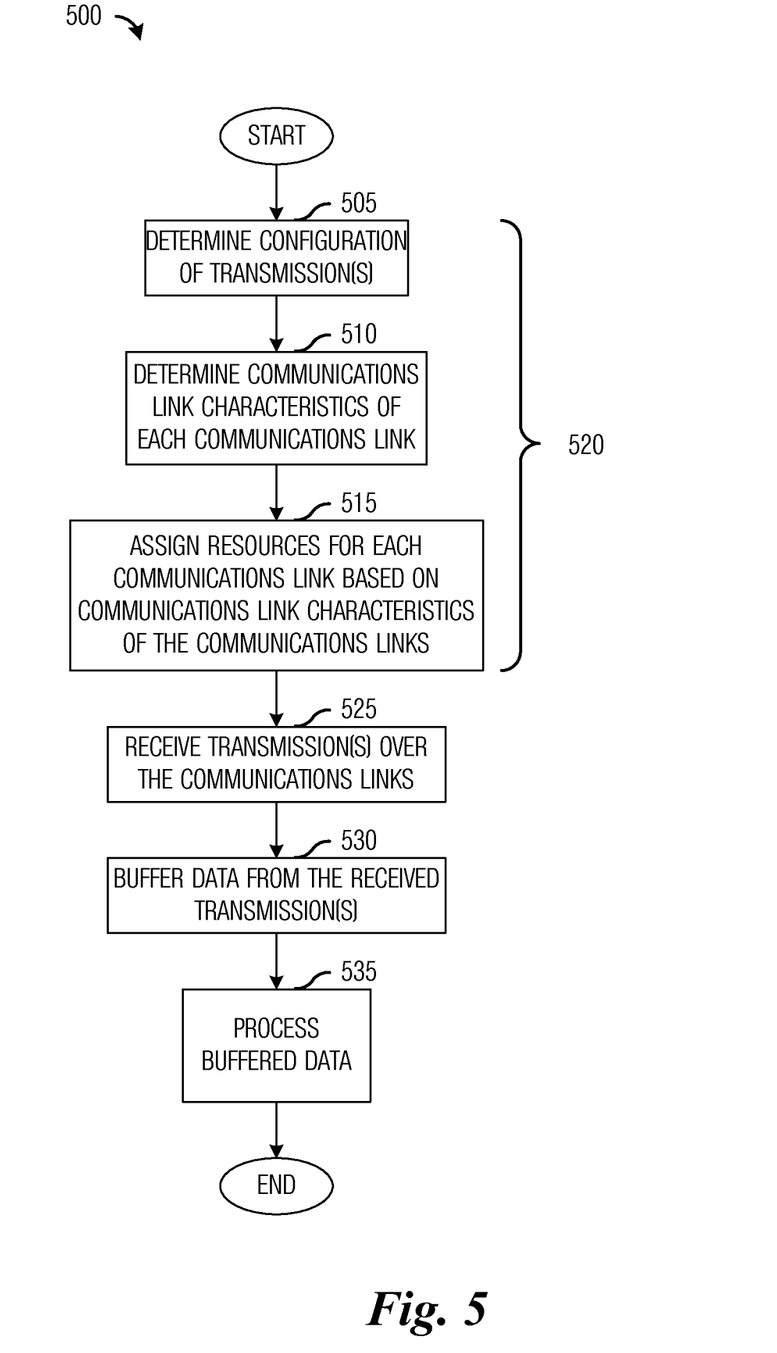
FIG. 5 illustrates an example flow diagram of operations in processing a transmission or transmissions received over a plurality of communications links, wherein buffers associated with each of the plurality of communications links may be assigned based on capacity characteristics of the communications links according to example embodiments described herein.

FIG. 5 illustrates a flow diagram of operations 500 in processing a transmission or transmissions received over a plurality of communications links, wherein buffers associated with each of the plurality of communications links may be assigned based on capacity characteristics of the communications links. Operations 500 may be indicative of operations occurring in a UE, such as UE 105, UE 205, or UE 305, as the UE receives a transmission or transmissions over the plurality of communications links from one or more transmission points, such as eNBs, relay nodes, other UEs, information sources, and the like. The transmission points may access the UE using a single RAT or multiple RATs.

Operations 500 begin with the UE determining a configuration of a transmission or transmissions that it is about to receive (block 505). According to an example embodiment, the UE determines the configuration of the transmission or transmissions through signaling received from a transmission point. As an example, considering a scenario wherein the UE is operating in a 3GPP LTE Release-10 compliant communications system, the signaling from the transmission point (or a management entity) informs the UE of the number of communications links, a MIMO mode(s), communications link bandwidths, a number of downlink layers, and the like. As another example, considering a scenario wherein the UE is operating in a communications system utilizing multiple point transmission or coordinated multiple point transmission, the signaling from the transmission point informs the UE of the number of communications links, a MIMO mode(s), communications link bandwidth, a number of downlink layers, and the like.

The UE determines communications link characteristics of the individual communications links from the configuration of the transmission or the transmissions (block 510). Additionally, the communications link characteristics of the individual communications links may also be based on the capabilities of the UE, such as a number of MIMO layers that the UE is capable of supporting.

In general, communications link characteristics of a communications link are based on a bandwidth of the communications link, coding utilized in the communications link, number of MIMO layers, and the like. The communications link characteristics of each communications link may provide an estimate or a bound on a size of a buffer (or some other allocatable resource) for the communications link. According to an example embodiment, the UE determines the communications link characteristics for each of the communications links of the plurality of communications links from the configuration of the transmission or the transmissions, as well as its own capability.

The UE assigns a buffer for each communications link in the plurality of communications link out of an overall buffer based on the communications link characteristics of each respective communications link, as well as communications link characteristics of the plurality of communications links (block 515). According to an example embodiment, the UE may assign the buffers for the plurality of communications links based on the communications link characteristics of each communications link in relation to a combined communications link characteristics of the plurality of communications links. As an example, considering a scenario wherein the UE is operating in a 3GPP LTE Release-10 compliant communications system, the parameters for the communications links are as follows:

The parameters that are inherited from 3GPP LTE Release-8 are:
- $N_{soft}$ is the total number of soft channel bits;
- $M_{DL\_HARQ}$ is the maximum number of DL HARQ processes as defined in section 7 of 3GPP TS 36.213; and
- $M_{limit}$ is a constant equal to 8.

The parameters introduced to support 3GPP LTE Release-10 are:
- $N_{carrier}$ is the total number of UE-specific aggregated communications links (component carriers);
- $K_{MIMO}(n_c)$ is equal to 2 if the UE is configured to receive physical downlink shared channel (PDSCH) transmissions on the $n_c$-th carrier, based on transmission modes 3, 4, 8 or 9 as defined in section 7.1 of 3GPP R1-105097, 1 otherwise;
- $L_{max}(n_c)$ is the maximum number of downlink layers on the $n_c$-th carrier; and
- $BW(j)$ is the bandwidth of the j-th communications link (component carrier) in MHz.

As an example, $BW(j)=10$ if a j-th communications link (component carrier) has a bandwidth of 10 MHz, $BW(j)=20$ if a j-th communications link (component carrier) has a bandwidth of 20 MHz. It is noted that other units can be used to represent the bandwidth as well, for example, $BW(j)$ can be equivalently represented by the number of resource blocks for the given bandwidth.

According to an example embodiment, the buffer for each communications link (component carrier) is allocated by first dividing the overall buffer between the aggregated communications links (component carriers) according to the communications link characteristics of each communications link (component carrier), which can be derived from the UE capability parameters of downlink MIMO and carrier aggregation. The parameters that are considered include: the bandwidth of each communications link (component carrier), and the maximum number of downlink layers. From the overall buffer size, the buffer size for the $n_c$-th carrier, $N_{soft}(n_c)$, is expressed as $$N_{soft}(n_c) = \frac{N_{soft} \cdot L_{max}(n_c) \cdot BW(n_c)}{\sum_{j=0}^{N_{carrier}-1} L_{max}(j) \cdot BW(j)}. \quad (1)$$

It is observed that $N_{soft}(n_c)$ is determined by the UE category and/or capability parameters, not parameters that can be changed by dynamic or semi-dynamic signaling. Thus each communications link (component carrier) can operate without accounting for changes to other communications link's (component carrier's) configurations. Calculations according Equation (1) are necessary since the communications links (component carriers) assigned to a UE may have different bandwidth and/or different max number of layers, i.e., different capacity characteristics.

Then, for $n_c$-th carrier, a size for an i-th transmission block is calculated as in 3GPP LTE Release-8, substituting $N_{soft}(n_c)$ for $N_{soft}$, $K_{MIMO}(n_c)$ for $K_{MIMO}$, which is expressed as $$N_{IR}(n_c) = \left\lfloor \frac{N_{soft}(n_c)}{K_{MIMO}(n_c) \cdot \min(M_{DL\_HARQ}, M_{limit})} \right\rfloor. \quad (2)$$

It is noted that Equation (2) is the same as an equation for buffer allocation in 3GPP LTE Release-8. Equation (2) may be reduced to the 3GPP LTE Release-8 buffer allocation equation if there is only one communications link. Furthermore, parameter $K_{MIMO}(n_c)$, which is modified separately for separate communications links (component carriers), is included in Equation (2) to account for the MIMO mode change so that the buffer can be fully utilized.

Regarding the number of DL HARQ processes $M_{DL\_HARQ}$, for frequency division duplexed (FDD) operation $M_{DL\_HARQ}=8$; for time division duplexed (TDD) operation $M_{DL\_HARQ}$ is determined by the uplink and/or downlink configuration as indicated in Table 7-1 of 3GPP TS 36.213. It is expected that $M_{DL\_HARQ}$ is the same across all communications links scheduled for a given UE.

Advantages of Equations (1) and (2) include:
- A buffer size budget for each communications link (component carrier) is fixed and does not change depending on MIMO configuration and/or the activation/deactivation of a communications link (component carrier), which changes independently for the communications links (component carriers). Thus $N_{soft}(n_c)$ can be defined by equations such as Equation (1), or it can be explicitly defined as part of the UE category parameter; and
- Within a communications link (component carrier), the buffer size for a transmission block is adjusted according to the MIMO mode configuration. Thus if there is only one transmission block transmitted in a subframe, it can utilize the entirety of the overall buffer dimensioned for a HARQ process of the $n_c$-th carrier. If there are two transmission blocks transmitted in a subframe, then the overall buffer can be shared equally between the two transmission blocks.

While Equations (1) and (2) are presented as two separate steps, they can be combined as follows $$N_{soft}(n_c) = \left\lfloor \frac{N_{soft} \cdot L_{max}(n_c) \cdot BW(n_c)}{\left( \sum_{j=0}^{N_{carrier}-1} L_{max}(j) \cdot BW(j) \right) K_{MIMO}(n_c) \cdot \min(M_{DL\_HARQ}, M_{limit})} \right\rfloor. \quad (3)$$

As another example, again considering a scenario wherein the UE is operating in a 3GPP LTE Release-10 compliant communications system, buffer allocation in 3GPP LTE Release-8 may be based on an assumption that the buffer size is constrained to be smaller than what naturally exists due to a turbo coding process. Specifically, a mother code rate is raised to code rate of ⅔ rather than a natural mother code rate of ⅓. As an alternative, the constraint may be relaxed by allowing the natural code rate of ⅓ to be used. If this is the case, then the buffer size is defined based on a maximum number of communications links (component carriers), a maximum number of downlink layers, and a maximum transmission block size. In such a situation, only $N_{soft}$ needs to be calculated for each UE category, while parameter $N_{IR}(n_c)$ may no longer be necessary. A loose estimate for $N_{soft}$ is expressible as $$N_{soft} \approx \sum_{j=0}^{N_{carrier}-1} M'_{DL\_HARQ} \times 3 \times TBS_{max}(j) N_{TB}(j), \quad (4)$$

where $M'_{DL\_HARQ}=8$ if FDD; $M'_{DL\_HARQ}=15$ if TDD is used since there are maximum of 15 HARQ processes considering all configurations; $TBS_{max}(j)$ is the maximum TB size given the maximum number of layers for carrier j; and $N_{TB}(j)$ is the maximum number of TBs on carrier j. Equation (4) may result in a large value for $N_{soft}$, especially when TDD is used.

Collectively, the determining the configuration of the transmission or transmission (block 505), the determining the communications link characteristics of each communications link (block 510), and the assigning a buffer for each communications link based on the communications link characteristics of the communications links (block 515) may be referred to as designing a buffer (or an allocatable resource) for each communications link (blocks 520).

The UE receives the transmission or the transmissions over the plurality of communications links (block 525), buffers data from the transmission or the transmissions received over the plurality of communications links (block 530) and processes the buffered data (block 535).

Figure 6A:
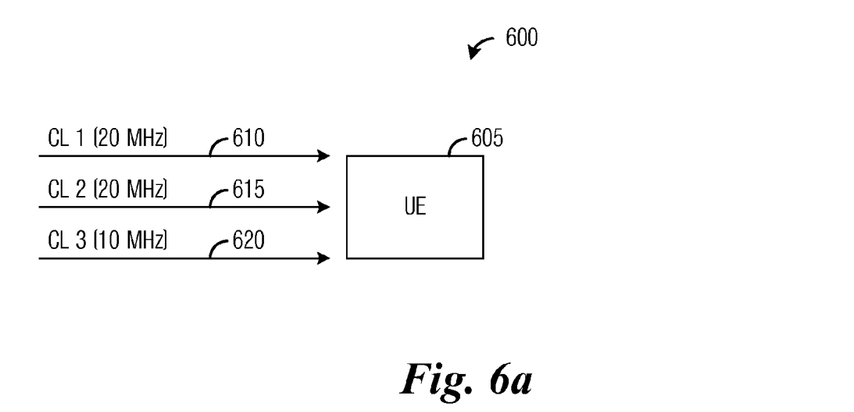
FIG. 6a illustrates an example UE receiving a transmission made over a plurality of communications links according to example embodiments described herein.

FIG. 6a illustrates a UE 605 receiving a transmission made over a plurality of communications links. As shown in FIG. 6a, UE 605 is receiving a transmission made over three communications links. The communications links may have different capabilities, which may be characterized by communications link characteristics. For example, a CL 1 610 has a 20 MHz bandwidth, a CL 2 615 has a 20 MHz bandwidth, and a CL 3 620 has a 10 MHz bandwidth. The communications links may be aggregated into a single communications channel or the communications links may be used by different transmissions points to transmit to UE 605. For simplicity in discussion, assume that each communications link's communications link characteristics are directly proportional to its bandwidth.

Figure 6B:
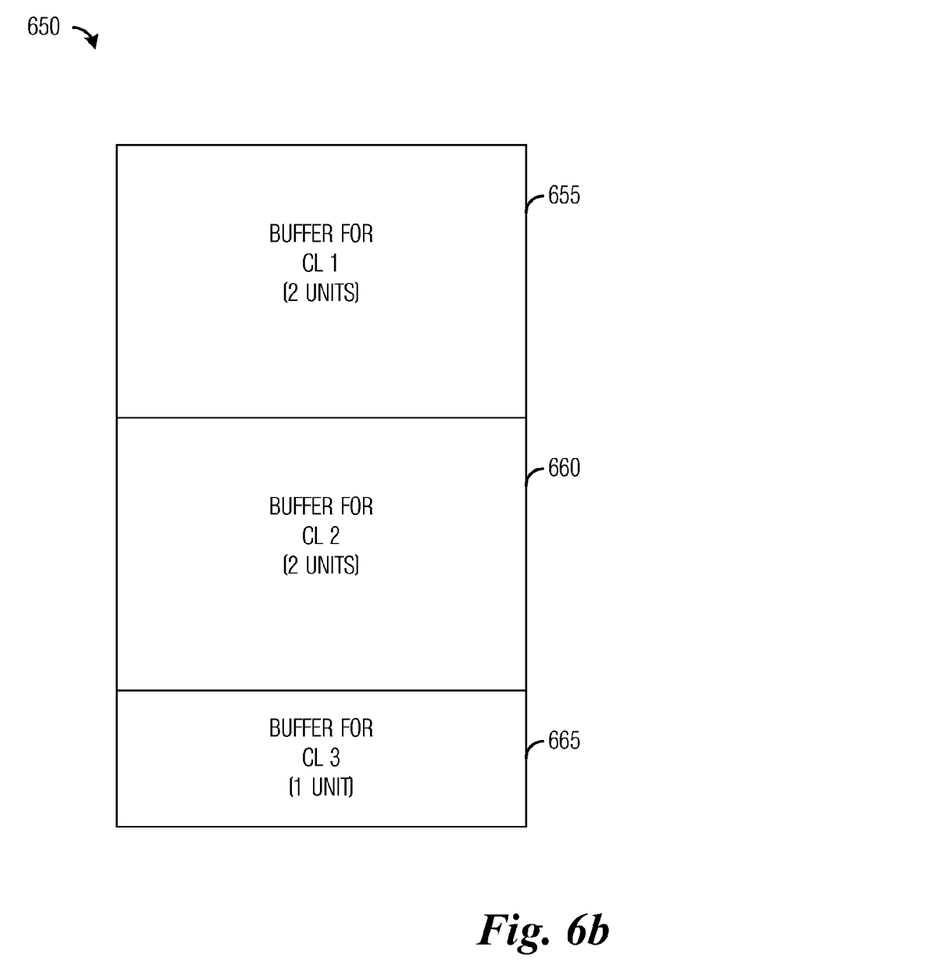
FIG. 6b illustrates an example buffer according to example embodiments described herein.

FIG. 6b illustrates a buffer 650. Buffer 650 is used to allocate individual buffers for buffering data from the plurality of communications links shown in FIG. 6a. The buffers may be assigned based on communications link characteristics, such as overall bandwidth, of the communications links in the plurality of communications links.

With the bandwidth of the communications links in the plurality of communications links being 20 MHz, 20 MHz, and 10 MHz, respectively, buffer 650 is allocated into three buffers: a first buffer 655 for CL 1 610, a second buffer 660 for CL 2 615, and a third buffer 665 for CL 3 620. First buffer 655 and second buffer 660 are allocated the same amount of buffer memory, while third buffer 665 is allocated half the buffer memory of first buffer 655 and second buffer 660 due to its smaller bandwidth. As an example, third buffer 665 is allocated 1 unit of buffer memory, while first buffer 655 and second buffer 660 are allocated 2 units of buffer memory. In other words, the buffer memory allocated to a communications link may be based on a ratio of communications link characteristics of the communications link to combined communications link characteristics of all the communications links.

Although the discussion of the example embodiments presented above focuses on buffers and buffer memory, the example embodiments may be applicable to allocatable receiver resources that are used in reception of transmissions over a plurality of communications links in general. As an example, in addition to buffers and buffer memory, allocatable receiver resources that are assigned for receiving transmissions over a plurality of communications links also comprises reception antennas, reception radio frequency (RF) chain, or a combination thereof. Therefore, the discussion of buffers and buffer memory should not be construed as being limiting to the scope or the spirit of the example embodiments.

Figure 7:
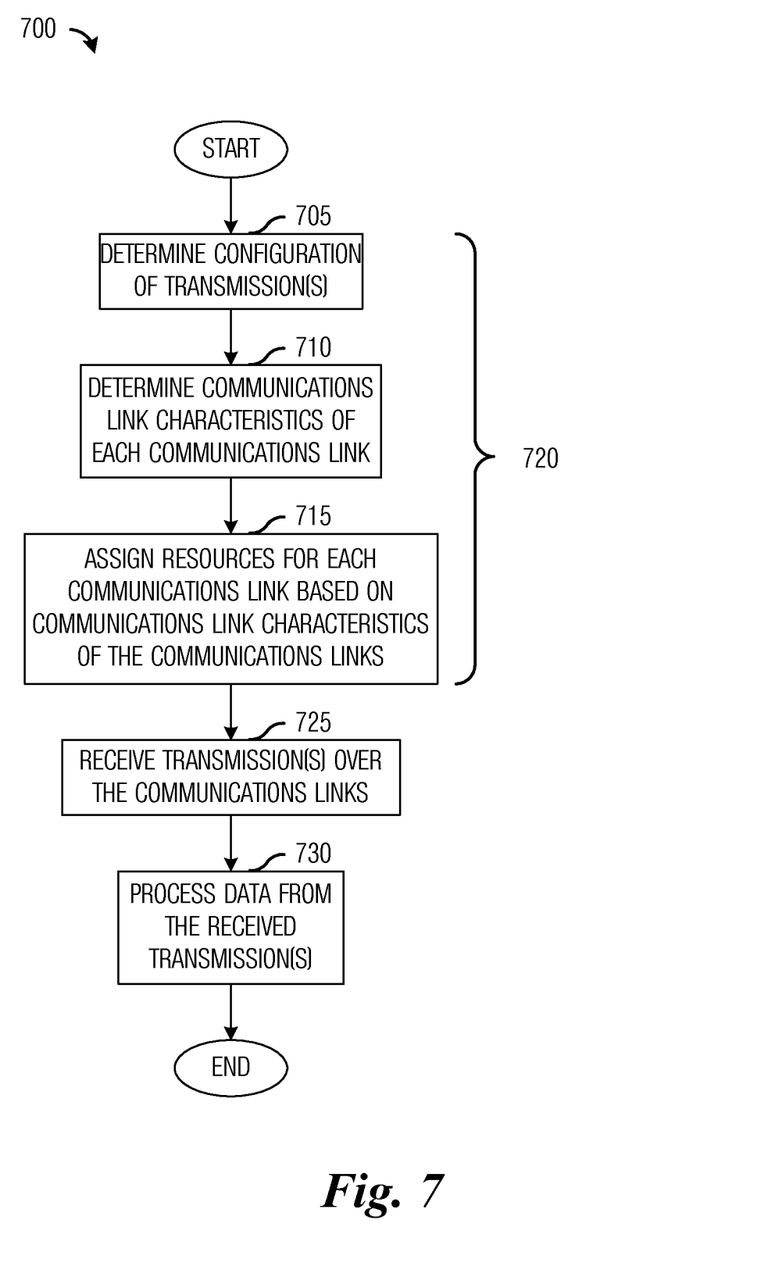
FIG. 7 illustrates an example flow diagram of operations in processing a transmission or transmissions over a plurality of communications links according to example embodiments described herein.

FIG. 7 illustrates a flow diagram of operations 700 in processing a transmission or transmissions over a plurality of communications links, wherein allocatable receiver resources associated with each of the plurality of communications links are assigned based on communications link characteristics of the communications links. Operations 700 may be indicative of operations occurring in a UE, such as UE 105, UE 205, or UE 305, or any other device that is receiving a transmission or transmissions over a plurality of communications links, as the UE receives a transmission or transmissions over the plurality of communications links from one or more transmission points, such as eNBs, relay nodes, other UEs, information sources, and the like. The transmission points accesses the UE using a single RAT or multiple RATs.

Operations 700 begin with the UE determining a configuration of a transmission or transmissions that it is about to receive (block 705). According to an example embodiment, the UE determines the configuration of the transmission or transmissions through signaling received from a transmission point.

The UE determines communications link characteristics of the individual communications links from the configuration of the transmission or the transmissions (block 710). Additionally, the communications link characteristics of the individual communications links are also based on the capabilities of the UE, such as a number of MIMO layers that the UE is capable of supporting.

In general, the communications link characteristics of a communications link are based on a bandwidth of the communications link, coding utilized in the communications link, number of MIMO layers, communications link data rate, quality of service requirements of an application utilizing the communications link, user and/or application priority, UE power consumption, interference situation, and the like. The communications link characteristics of each communications link may provide an estimate or a bound on allocatable receiver resources for the communications link, where the allocatable receiver resources comprises a link buffer, receive antenna, receive RF chain, and the like. According to an example embodiment, the UE determines the communications link characteristics for each of the communications links of the plurality of communications links from the configuration of the transmission or the transmissions, as well as its own capability.

The UE assigns a number of base units of allocatable receiver resource(s) for each communications link in the plurality of communications link out of an overall allocatable receiver resource pool based on the communications link characteristics of each respective communications link, as well as communications link characteristics of the plurality of communications links (block 715). According to an example embodiment, a measure is derived from the communications link characteristics of each respective communications link and a combined communications link characteristics of the plurality of communications links. As an example, the measure may be a ratio of a bandwidth of each communications link to a combined bandwidth of the plurality of communications links.

Generally, a base unit of an allocatable receiver resource may be a minimal allocatable unit of the allocatable receiver resource. As an example, if the allocatable receiver resource is a link buffer, than the base unit would be buffer memory in bytes or bits. While if the allocatable receiver resource is a receive antenna, then the base unit would be a single receive antenna. Similarly, if the allocatable receiver resource is a receive RF chain, then the base unit would be a receive RF chain component.

Collectively, the determining the configuration of the transmission or transmission (block 705), the determining the communications link characteristics of each communications link (block 710), and the assigning of allocatable receiver resources for each communications link based on the communications link characteristics of the communications links (block 715) are referred to as designing a receiver for each communications link (blocks 720).

The UE receives the transmission or the transmissions over the plurality of communications links (block 725), and processes data from the received transmission or transmissions (block 730).

Although the discussion of the example embodiments presented above focuses on receiving transmissions over a plurality of communications links, the example embodiments may also be applicable to transmitting transmissions over a plurality of communications links. As an example, allocatable transmitter resources that may be assigned for transmitting transmissions over a plurality of communications links comprises buffers, buffer memory, transmission power, transmission antennas, transmission RF chain, or a combination thereof. Therefore, the discussion of receiving transmissions should not be construed as being limiting to the scope or the spirit of the example embodiments.

Figure 8:
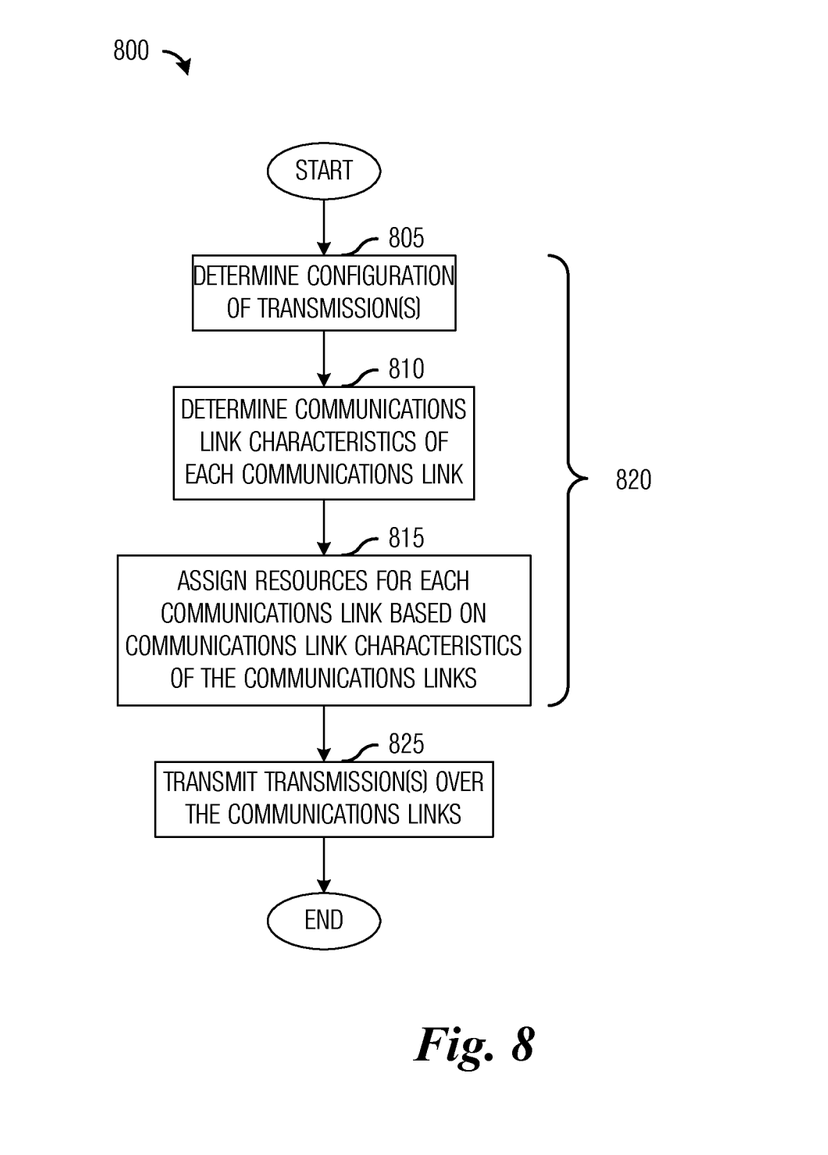
FIG. 8 illustrates an example flow diagram of operations in transmitting over a plurality of communications links according to example embodiments described herein.

FIG. 8 illustrates a flow diagram of operations 800 in transmitting over a plurality of communications links, wherein allocatable transmitter resources associated with each of the plurality of communications links are assigned based on communications link characteristics of the communications links. Operations 800 may be indicative of operations occurring in a transmission point, such as transmission points 110, 210, 211, 212, 310, 311, or 312, or a UE, such as UE 105, UE 205, or UE 305, as the transmission point transmits over the plurality of communications links. The transmission occurs over a single RAT or multiple RATs.

Operations 800 begin with the transmission point determining a configuration of a transmission or transmissions that it is about to transmit (block 805). According to an example embodiment, the transmission point determines the configuration of the transmission or transmissions based on operating conditions of an intended recipient of the transmission or transmissions. According to an alternative embodiment, the transmission determines the configuration of the transmission or transmissions through information received from a network entity, such as a multiple point transmission controller or a coordinated multiple point transmission controller.

The transmission point determines communications link characteristics of the individual communications links from the configuration of the transmission or the transmissions (block 810). Additionally, the communications link characteristics of the individual communications links may also be based on the capabilities of the intended recipient, such as a number of MIMO layers that the intended recipient is capable of supporting.

In general, communications link characteristics of a communications link are based on a bandwidth of the communications link, communications link data rate, coding utilized in the communications link, number of MIMO layers, quality of service requirements of an application utilizing the communications link, user and/or application priority, UE power consumption, interference situation, and the like. The communications link characteristics of each communications link may provide an estimate or a bound on allocatable transmitter resources for the communications link, where the allocatable transmitter resources comprises transmit power level, transmit antenna, transmit RF chain, and the like. According to an example embodiment, the transmission point determines the communications link characteristics for each of the communications links of the plurality of communications links from the configuration of the transmission or the transmissions, as well as the capability of the intended recipient.

The transmission point assigns a number of base units of allocatable transmitter resource(s) for each communications link in the plurality of communications link out of an overall allocatable transmitter resource pool based on the communications link characteristics of each respective communications link, as well as communications link characteristics of the plurality of communications links (block 815). According to an example embodiment, a measure is derived from the communications link characteristics of each respective communications link and a combined communications link characteristics of the plurality of communications links. As an example, the measure may be a ratio of a bandwidth of each communications link to a combined bandwidth of the plurality of communications links.

Generally, a base unit of an allocatable transmitter resource may be a minimal allocatable unit of the allocatable transmitter resource. As an example, if the allocatable transmitter resource is a transmit power, than the base unit would be a transmit power level, e.g., in dB. While if the allocatable receiver resource is a transmit antenna, then the base unit would be a single transmit antenna. Similarly, if the allocatable receiver resource is a transmit RF chain, then the base unit would be a transmit RF chain component.

Collectively, the determining the configuration of the transmission or transmission (block 805), the determining the communications link characteristics of each communications link (block 810), and the assigning of allocatable receiver resources for each communications link based on the characteristics of the communications links (block 815) are referred to as designing a transmitter for each communications link (blocks 820). The transmission point transmits the transmission or transmissions to the intended recipient over the plurality of communications links (block 825).

Figure 9:
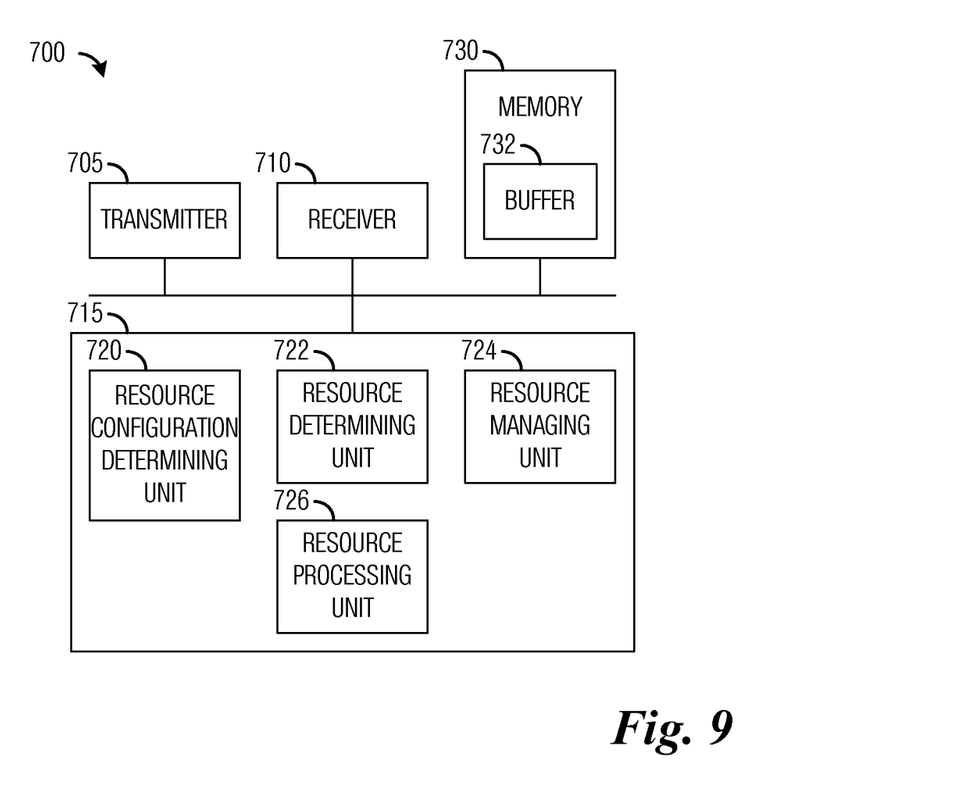
FIG. 9 illustrates an example diagram of a communications device according to example embodiments described herein.

FIG. 9 illustrates a diagram of a communications device 700. Communications device 900 may be an implementation of a transmitting device, such as a transmission point of a communications system of a communications system, or a receiving device, such as a UE the communications system. It is noted that although referred to as a transmission point, in many implementations, a transmission point may also be capable of receiving transmissions over a plurality of communications links. Similarly, a UE will also often be capable of transmitting over multiple communications links.

Communications device 900 may be used to implement various ones of the embodiments discussed herein. As shown in FIG. 9, a transmitter 905 is configured to send messages, information, and the like, and a receiver 910 is configured to receive messages, information, and the like. Transmitter 905 and/or receiver 910 are configured to transmit and/or receive over a plurality of communications links. Transmitter 905 and receiver 910 may have a wireless interface, a wireline interface, or a combination thereof.

A resource configuration determining unit 920 is configured to determine a configuration of a transmission or transmissions to be received by communications device 900 or a transmission or transmissions to be transmitted by communications device 900, wherein the transmission or the transmissions occurs over a plurality of communications links. Resource configuration determining unit 920 receives signaling from a transmission point transmitting to communications device 900, a management entity controlling communications, or performs self-determination. A resource determining unit 922 is configured to determine an allocatable resource (e.g., allocatable receiver resources or allocatable transmitter resources) assignment for each communications link in the plurality of communications links. Resource determining unit 922 makes use of the configuration of the transmission or transmissions to determine communications link characteristics for the communications links, which may then be used to determine the allocatable resource allocations. Resource determining unit 922 derives a measure from communications links characteristics of individual communications links and a combined communications links characteristics of the plurality of communications links and uses the measure to determine the allocatable resource allocation.

A resource managing unit 924 is configured to manage the assignment of allocatable resources, such as buffer memory in a buffer, e.g., a buffer 932 in a memory 930. Resource managing unit 924 makes use of allocatable resource assignments determined by resource determining unit 922 to assign the allocatable resources. Resource management is also configured to manage the assignment of other allocatable resources, such as allocatable transmitter resources (transmit power level, transmit antenna, transmit RF chain components) and allocatable receiver resources (such as receive antenna, receive RF chain components, buffer memory), and the like. Resource processing unit 926 is configured to control the operation of the allocatable resources. As an example, resource processing unit 926 buffers data from the transmission or transmissions in buffer 932. Resource processing unit 926 also retrieves data buffered in buffer 932 for processing. Memory 930 is also configured to store the configuration of the transmission or transmissions, buffer allocation values for the plurality of communications links, allocatable resource assignments, communications link characteristics, and the like.

The elements of communications device 900 may be implemented as specific hardware logic blocks. In an alternative embodiment, the elements of communications device 900 may be implemented as software executing in a processor, controller, application specific integrated circuit, or the like. In yet another alternative embodiment, the elements of communications device 900 may be implemented as a combination of software and/or hardware.

As an example, transmitter 905 and receiver 910 may be implemented as a specific hardware block, while resource configuration determining unit 920, resource determining unit 922, resource managing unit 924, and resource processing unit 926 may be software modules executing in a processor 915, such as a microprocessor, a digital signal processor, a custom circuit, or a custom compiled logic array of a field programmable logic array.

Although the present invention and its advantages have been described in detail, it should be understood that various changes, substitutions and alterations can be made herein without departing from the spirit and scope of the invention as defined by the appended claims.

What is claimed is:

1. A method for operating a device in receiving a transmission over a plurality of communications links, the method comprising:

determining, for each communications link in the plurality of communications links, a ratio according to:

$$\frac{\text{communications link characteristics of each respective communications link}}{\text{combined communications link characteristics of the plurality of communications links}}$$

wherein each of the communications link characteristics is determined according to a product of a quantity of multiple-input and multiple-output (MIMO) layers supported by the device for the communications link and a bandwidth allocated by the device to the communications link;

dividing an overall pool of an allocatable receiver resource into a plurality of minimal allocatable units of the allocatable receiver resource;

assigning one or more of the minimal allocatable units of the allocatable receiver resource to each communications link in the plurality of communications links according to the ratio for each respective communications link of the plurality of communications links;

receiving data in the transmission with each communications link using the minimal allocatable units of the assigned allocatable receiver resource assigned to each communications link; and processing the data received with the minimal allocatable units of the allocatable receiver resource for each communications link.

2. The method of claim 1, wherein the allocatable receiver resource comprises a link buffer, a receive antenna, a receive radio frequency chain, or a combination thereof.

3. The method of claim 1, wherein determining the ratio comprises:

determining a combined configuration of the transmission and of the plurality of communications links;

determining the communications link characteristics for each communications link in the plurality of communications links according to the combined configuration; and deriving the ratio for each communications link of the plurality of communications links.

4. The method of claim 3, wherein the allocatable receiver resource is a link buffer, and wherein assigning the one or more of the minimal allocatable units of the allocatable receiver resource comprises assigning buffer memory for a link buffer for each communications link in the plurality of communications links according to the ratio of the respective communications link.

5. The method of claim 4, wherein deriving the ratio comprises determining a memory size ratio of the communications link characteristics of a current communications link to the combined communications link characteristics of the plurality of communications links.

6. The method of claim 3, further comprising assigning the allocatable receiver resource according to a capability of the device.

7. The method of claim 3, wherein determining the combined configuration of the transmission comprises receiving signaling of the combined configuration.

8. The method of claim 1, wherein the device is operating in a Third Generation Partnership Project Long Term Evolution compliant communications system, wherein the device is receiving the transmission from a single transmission point over the plurality of communications links, and wherein the communications link characteristics of a current communications link are determined according to one or more of the following: a number of soft channel bits, a maximum number of hybrid automatic repeat requested processes, a limiting constant, a number of device-specific aggregated communications links, a number of multiple input, multiple output layers, a maximum number of layers in a communications link, a bandwidth of the current communications link, a data rate of the current communications link, a coding scheme used in the current communications link, a quality of service requirement of an application utilizing the current communications link, a priority of the device, a priority of a user of the device, a priority of the application, a power consumption of the device, and an interference situation of the device.

9. The method of claim 8, wherein the plurality of communications links is aggregated into a single communications channel.

10. The method of claim 1, wherein the device is receiving the transmission from a plurality of transmission points, and wherein the transmission is received over a single access technology.

11. The method of claim 10, wherein the device is simultaneously receiving the transmission from the plurality of transmission points.

12. The method of claim 1, wherein the device is receiving the transmission from a plurality of transmission points, and wherein the device is receiving the transmission from the plurality of transmission points over at least two different access technologies.

13. A method for operating a device in transmitting a transmission over a plurality of communications links, the method comprising:
    determining, for each communications link in the plurality of communications links, a ratio according to:

$$\frac{\text{communications link characteristics of each respective communications link}}{\text{combined communications link characteristics of the plurality of communications links}}$$

wherein each of the communications link characteristics is determined according to a product of a quantity of multiple-input and multiple-output (MIMO) layers supported by an intended recipient device for the communications link and a bandwidth allocated by the device to the communications link;
    dividing an overall pool of an allocatable transmitter resource into a plurality of minimal allocatable units of the allocatable transmitter resource;
    assigning one or more of the minimal allocatable units of the allocatable transmitter resource to each communications link in the plurality of communications links according to the ratio for each respective communications link of the plurality of communications links; and
    transmitting data in a transmission to the intended recipient device with each communications link of the plurality of communications links using the one or more of the minimal allocatable units of the assigned allocatable transmitter resource assigned to each communications link.

14. The method of claim 13, wherein the allocatable transmitter resource comprises a transmit power, a transmit antenna, a transmit radio frequency chain, or a combination thereof.

15. The method of claim 13, wherein determining the ratio comprises:
    determining a combined configuration of the transmission and of the plurality of communications links;
    determining the communications link characteristics for each communications link in the plurality of communications links according to the combined configuration; and
    deriving the ratio for each communications link of the plurality of communications links.

16. The method of claim 15, further comprising assigning the allocatable transmitter resource according to a capability of the intended recipient device.

17. A device comprising:
    a processor configured to:
        determine, for each communications link in a plurality of communications links, a ratio according to:

$$\frac{\text{communications link characteristics of each respective communications link}}{\text{combined communications link characteristics of the plurality of communications links}};$$

divide an overall pool of an allocatable receiver resource into a plurality of minimal allocatable units of the allocatable receiver resource;
        assign one or more of the minimal allocatable units of the allocatable receiver resource to each communications link in the plurality of communications links according to the ratio for each respective communications link of the plurality of communications links; and
        process received data with the minimal allocatable units of the allocatable receiver resource for each communications link; and
    a receiver coupled to the processor, the receiver configured to:
        receive the data in a transmission with each communications link using the minimal allocatable units of the allocatable receiver resource assigned to each communications link, wherein each of the communications link characteristics is determined according to a product of a quantity of multiple-input and multiple-output (MIMO) layers supported by the receiver for the communications link and a bandwidth allocated to the communications link.

18. The device of claim 17, wherein the allocatable receiver resource comprises a link buffer, a receive antenna, a receive radio frequency chain, or a combination thereof.

19. The device of claim 17, wherein the processor is configured to:
    determine a combined configuration of the transmission and of the plurality of communications links;
    determine the communications link characteristics for each communications link in the plurality of communications links according to the combined configuration; and
    derive the ratio for each communications link of the plurality of communications links.

20. The device of claim 19, wherein the allocatable receiver resource is a link buffer, and the processor is configured to assign buffer memory to a link buffer for each communications link in the plurality of communications links according to the ratio of the communications link.

21. The device of claim 19, wherein the processor is configured to assign the allocatable receiver resource according to a capability of the device.

22. The device of claim 19, wherein the receiver is configured to receive signaling of the combined configuration.

23. The device of claim 17, wherein the device is a Third Generation Partnership Project Long Term Evolution compliant device, wherein the receiver is configured to receive the transmission from a single transmission point over the plurality of communications links, and wherein the communications link characteristics of a current communications link are determined according to one or more of the following: a number of soft channel bits, a maximum number of hybrid automatic repeat requested processes, a limiting constant, a number of device-specific aggregated communications links, a number of multiple input, multiple output layers, a maximum number of layers in a communications link, a bandwidth of the current communications link, a data rate of the current communications link, a coding scheme used in the current communications link, a quality of service requirement of an application utilizing the current communications link, a priority of the device, a priority of a user of the device, a priority of the application, a power consumption of the device, and an interference situation of the device.

24. The device of claim 17, wherein the receiver is configured to receive the transmission from a plurality of transmission points over a single access technology.

25. The device of claim 24, wherein the receiver is configured to simultaneously receive the transmission from the plurality of transmission points.

26. The device of claim 17, wherein the receiver is configured to receive the transmission from a plurality of transmission points over at least two different access technologies.

27. A device comprising:
a processor configured to:
determine, for each communications link in a plurality of communications links, a ratio according to:

$$\frac{\text{communications link characteristics of each respective communications link}}{\text{combined communications link characteristics of the plurality of communications links}};$$

divide an overall pool of an allocatable transmitter resource into a plurality of minimal allocatable units of the allocatable transmitter resource; and
assign one or more of the minimal allocatable units of the allocatable transmitter resource to each communications link in a plurality of communications links according to the ratio for each respective communications link of the plurality of communications links; and
a transmitter coupled to the processor, the transmitter configured to transmit data in a transmission to an intended recipient with each communications link of the plurality of communications links using the one or more of the minimal allocatable units of the allocatable transmitter resource assigned to each communications link, wherein each of the communications link characteristics is determined according to a product of a quantity of multiple-input and multiple-output (MIMO) layers supported by the intended recipient for the communications link and a bandwidth allocated by the device to the communications link.

28. The device of claim 27, wherein the allocatable transmitter resource comprises a transmit power, a transmit antenna, a transmit radio frequency chain, or a combination thereof.

29. The device of claim 27, wherein the processor is configured to:
determine a combined configuration of the transmission and of the plurality of communications links, to determine the communications link characteristics for each communications link in the plurality of communications links according to the combined configuration, and to derive the ratio for each communications link the plurality of communications link.

30. The device of claim 29, wherein the processor is configured to assign the allocatable transmitter resource according to a capability of the intended recipient.

* * * * *

UNITED STATES PATENT AND TRADEMARK OFFICE
CERTIFICATE OF CORRECTION

PATENT NO.        : 9,450,735 B2                                           Page 1 of 1
APPLICATION NO.   : 13/297740
DATED             : September 20, 2016
INVENTOR(S)       : Blankenship et al.

It is certified that error appears in the above-identified patent and that said Letters Patent is hereby corrected as shown below:

In the Claims

In Column 14, Line 26, Claim 1, delete "assigned allocatable receiver" and insert --allocatable receiver--.

In Column 15, Line 61, Claim 13, delete "assigned".

Signed and Sealed this
Tenth Day of January, 2017

Michelle K. Lee
*Director of the United States Patent and Trademark Office*